Sept. 28, 1965  F. W. LUKER  3,208,856
METHOD OF MAKING A MEAT PRODUCT
Filed Jan. 9, 1962  3 Sheets-Sheet 1
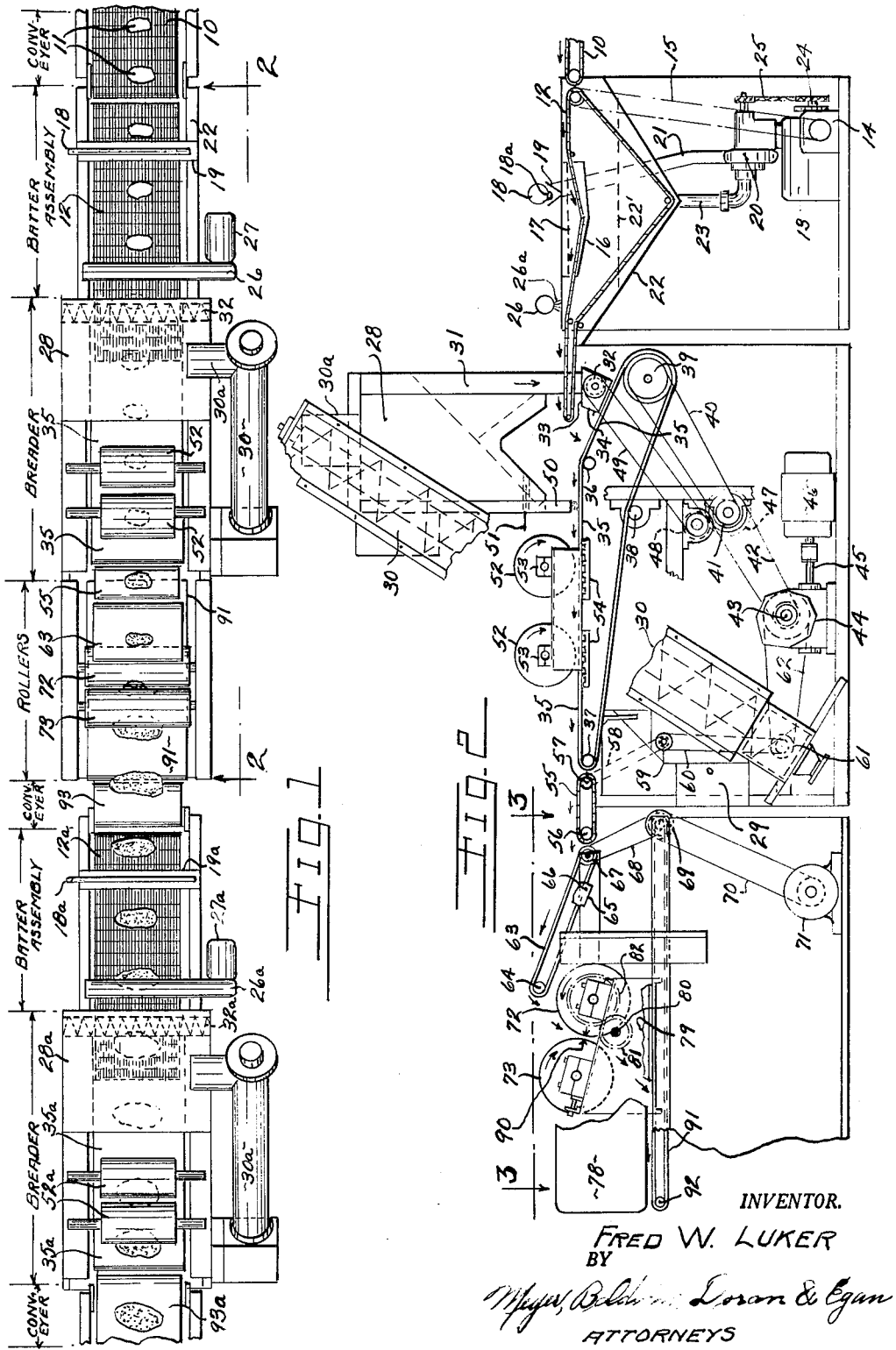

Sept. 28, 1965  F. W. LUKER  3,208,856
METHOD OF MAKING A MEAT PRODUCT
Filed Jan. 9, 1962  3 Sheets-Sheet 2
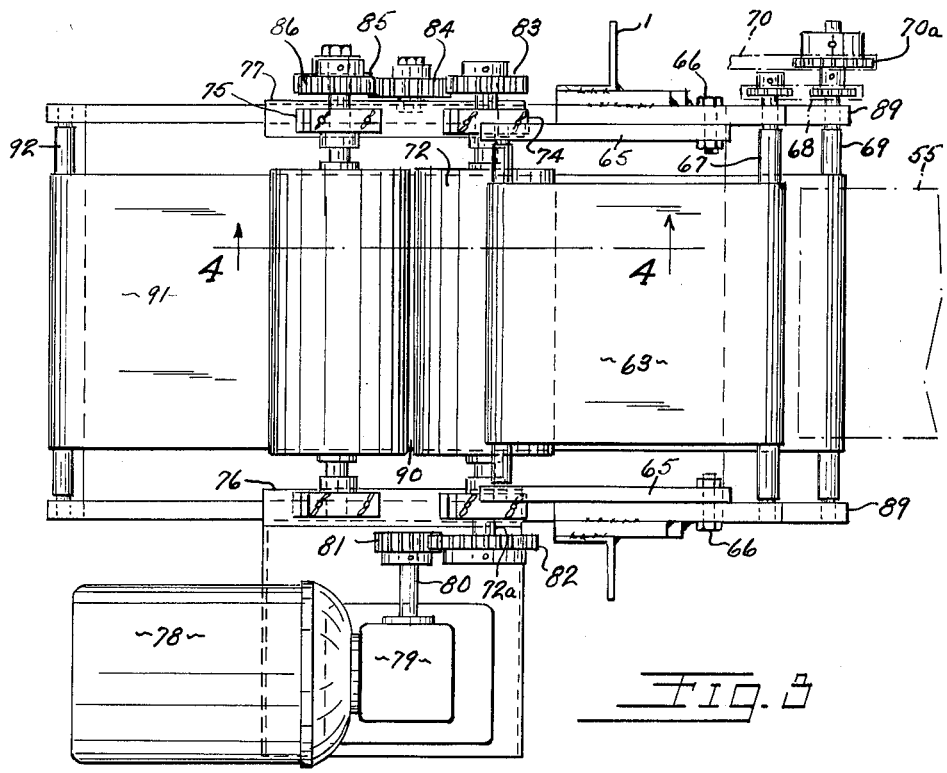
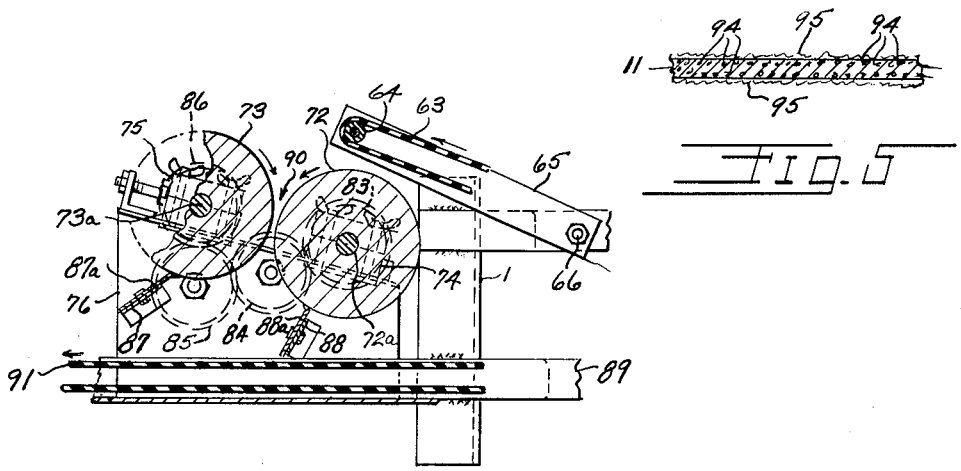
INVENTOR.
FRED W. LUKER
BY
Meyer, Baldwin, Doran & Egan
ATTORNEYS Sept. 28, 1965           F. W. LUKER           3,208,856
METHOD OF MAKING A MEAT PRODUCT
Filed Jan. 9, 1962           3 Sheets-Sheet 3
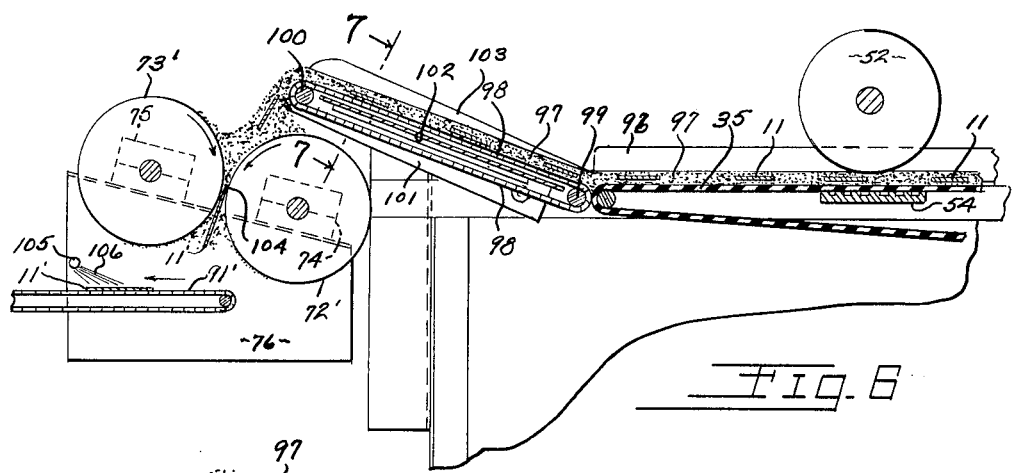
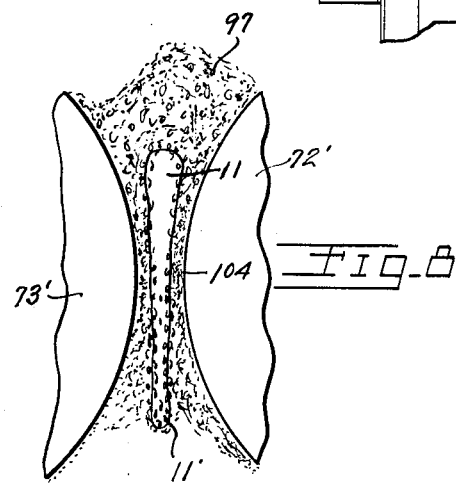
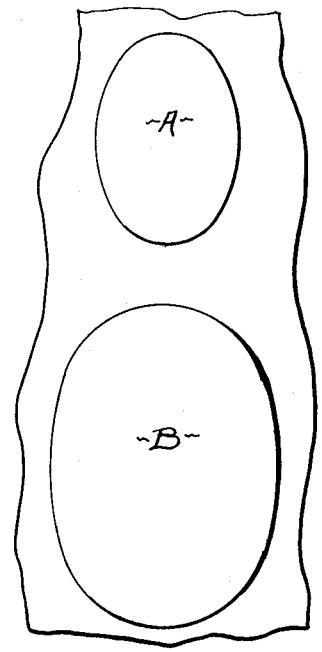
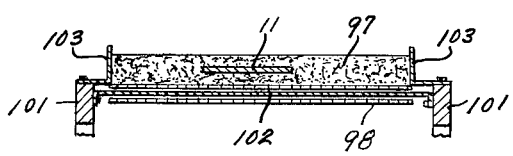
INVENTOR.
FRED W. LUKER
BY
Meyer, Baldwin, Doran & Egan
ATTORNEYS

United States Patent Office 3,208,856
Patented Sept. 28, 1965

3,208,856
METHOD OF MAKING A MEAT PRODUCT
Fred W. Luker, Noblesville, Ind., assignor to
John S. Marten, Indianapolis, Ind.
Filed Jan. 9, 1962, Ser. No. 165,146
1 Claim. (Cl. 99—107)

This invention relates to a meat or food product and to the method and apparatus for making the same. It particularly relates to a patty or fritter of compressed non-comminuted meat approximately 1/16 to 1/8 inch thick and impregnated substantially throughout its thickness with finely divided pieces of breadlike material.

An object of the present invention is to provide a novel method of making a composite meat patty or fritter comprising coating a slice of raw meat approximately 1/4 inch thick with finely divided pieces of breadlike material, cracker crumbs, or the like, and then compressing this slice by pressure of hard surfaces against the flat sides thereof, the predetermined setting between the surfaces and the amount of breadlike material between the surfaces and the meat being sufficient to flatten the meat patty and to increase its original area by approximately 100 to 150 percent which results in pressing the breadlike material, cracker crumbs, or the like, deeply into the meat and, since the meat in its compressed state is fairly thin, it results in a novel food product wherein the breadlike material, cracker crumbs, or the like, are impregnated into the meat substantially throughout its thickness.

The invention includes the food product which results from the method described in the preceding paragraph.

Other objects and advantages of this invention will be apparent from the accompanying description and the essential features thereof will be set forth in the appended claim.

In the drawings:

FIG. 1 is a top plan view of apparatus adapted to carry out this invention;

FIG. 2 is a fragmental side elevation, enlarged, of the apparatus shown in FIG. 1 taken generally along the line 2—2 of FIG. 1;

FIG. 3 is a top plan view taken generally along the line 3—3 of FIG. 2 and further enlarged and showing one form of meat compressing apparatus adapted to carry out this invention;

FIG. 4 is a fragmental sectional view taken along the line 4—4 of FIG. 3;

FIG. 5 is a fragmental sectional view, greatly enlarged, through the food product of this invention;

FIG. 6 is a fragmental sectional view through a modified form of apparatus for carrying out this invention, the position of this view in the general apparatus of FIGS. 1 and 2 being approximately the same as that of FIG. 4;

FIG. 7 is a transverse sectional view taken along the line 7—7 of FIG. 6;

FIG. 8 is a greatly enlarged sectional view showing a piece of meat passing between the two rollers of FIG. 6; while FIG. 9 is a diagrammatic view illustrating how the flattening action of this invention increases the area of the original meat slice by approximately 100 to 150 percent.

It should be understood at the outset, that various kinds of apparatus may be used to carry out this invention. That described herewith shows two preferred forms only.

In FIGS. 1 and 2, I have shown a known type of "breading" machine adapted to carry out the first step in the method for carrying out the present invention. At the right-hand end of the drawings in both views is shown and endless conveyor 10 preferably of open chain-like character, but not necessarily so. This conveyor is driven by any suitable means and is merely utilized for the operator to place raw meat slices 11 on the conveyor spaced from each other as they pass through the rest of the apparatus. The raw meat patties transfer themselves by conveyor movement to a second endless conveyor 12 of open chain-like construction traveling in the direction of the arrows of FIG. 2. This conveyor is driven from a motor 13 through a gear box 14 which drives a chain or belt member 15 through which the conveyor is propelled in the usual manner. Intermediate the upper run of the conveyor 12 is provided a closed pan 16 opening upwardly into which the conveyor dips impelled by guides along the sides thereof not shown in the drawings as it would merely confuse the same. This pan is filled with batter to the level 17 by means of a feed pipe 18 extending across the conveyor and having a large number of downwardly extending openings 18a which discharge batter into a trough-like guide 19 which directs the batter downwardly onto the meat product passing beneath it. The batter is fed to the pipe 18 by means of a pump 20 through a pipe 21. The return batter is pumped out of the bottom of a pan 22 which catches the overflow from the pan 16, and returns to the pump through the pipe 23. The pump is driven from a shaft 24 which in turn is driven by the motor 13 also and this has a drive connection at 25 to the pump drive shaft. At 26 is shown an air pipe extending entirely across the conveyor supplied with a plurality of downwardly directed jet openings 26a through which air is directed downwardly on the meat patties passing below it so as to drive off the excess batter deposited on the meat and driving the same into the receiving pan 22. The air is pumped by means indicated at 27. A screen 22′ across pan 22 prevents clogging of the pump inlet by slices of meat accidentally falling from belt 12.

The next step in the process is the depositing of a bread coating on all sides of the meat slice 11. This means comprises a bin 28 suitably supported above the conveyors along which the meat pieces travel. This bin is kept well filled with breadlike particles for "breading" the meat slices. Hereinafter in the specification and claim I shall use the term "breadlike" to indicate coarse cracker crumbs which are preferred for this particular use at the present time, but also to include finely comminuted bread, whether fresh, dried or toasted, and similar particles which would add a breadlike component to the final fritter or patty. The top of the bin is open so that additional breadlike material can be dumped in from time to time. Additionally, excess breadlike material which falls off the patty later in the process is collected in a chute or hopper 29 and carried by a screw conveyor 30 upwardly to a position adjacent the top of the bin 28 where it is discharged into the bin 28 through a trough 30a. Normally, means is provided near the top of the bin 28 for screening material returned to the bin but this forms no part of the present invention and is left out for the sake of clarity. At the right-hand side of the bin 28, as seen in FIG. 2, is provided a downwardly extending chute 31 which conveys breadlike material to one end of a screw conveyor 32 which extends completely across the width of the conveyor belt. The box or trough 33 is maintained full of breadlike material and opens at a control gate 34 which limits the amount of breaded material which falls upon an imperforate conveyor belt 35. This belt underlaps conveyor 12 and is guided over idler rollers 36, 37 and 38 and passes around drive roller 39. This drive roller is driven by a belt drive 40 from a pulley 41 which in turn is driven by belt 42 from the driven shaft 43 of a gear box 44 which, in turn, is powered by a drive shaft 45 of motor 46. Pulley 41 is on a shaft which carries a gear 47 meshing with a gear 48 which through belt 49 drives the screw conveyor 32. By the means just described, an even coating of breadlike material is spaced entirely across the conveyor belt 35 just ahead of the point where the meat slices drop off the end of conveyor 12 and fall onto the breadlike cushion on conveyor 35. Thus, the bottom of the meat slice is coated with breadlike material attaching itself to the batter.

In the next operation, the top of the meat slice is coated with breadlike material when it passes beneath a chute 50 which is provided with the breadlike material controlled by a gate 51 as the material passes down from the hopper or bin 28. Thus, breadlike material is coated over the top of each meat slice and is wetted by the batter on the meat slice so that the breadlike material attaches itself to the patty. The breading is next caused to firmly adhere to the meat patty by passing beneath two idler rolls 52 extending crosswise of the belt 35 and adjusted in their bearings 53 to a height above belt 35 just sufficient to firmly press the breadlike material into both sides of the meat patty. Preferably, back-up plates 54 are provided beneath belt 35 and opposite the rolls 52 to cause the breadlike material to be firmly embedded in the meat patty. Preferably, corrugations extending crosswise of belt 35 are provided in the back-up plates which cause the breadlike material to more firmly adhere to the meat patties.

At the end of conveyor 35, the meat patties transfer themselves to a transfer conveyor 55 which comprises an endless chain-like belt passing over an idler 56 and a driving pulley 57 which is driven by means of a belt 58 from a pulley 59 which in turn is driven by a belt 60 driven by a pulley 61 which in turn is driven by a belt 62 from the gear case 44 which was previously mentioned. The open conveyor 55 permits the excess breading material to fall into the chute or hopper 29 previously mentioned. The meat patties then transfer themselves from the belt 55 to a belt 63 which is inclined upwardly in the direction of travel as clearly shown in FIGS. 2 and 4. To this end, belt 63 passes around an idler 64 which is held in the desired position by an arm 65 at each end thereof which arm is held in the desired position by a bolt and nut connection 66 attached to a suitable part of the frame of the machine. The belt is driven from a pulley 67 which is driven by a belt 68 in turn driven from a pulley 69 driven by a belt 70 from motor 71.

Means is provided for greatly compressing the raw meat patties as clearly shown in FIGS. 2, 3 and 4. The meat compressing rollers 72 and 73 are of rigid material, such as metal, and are rotatably mounted by having shafts 72a and 73a, rigidly connected with their respective rollers, mounted in suitable bearings 74 and 75 which are held by end plates 76 and 77 attached to the machine frame on opposite sides of the rollers 72 and 73. For driving the rollers in the direction of the arrows indicated in FIG. 4, a motor 78 is mounted on the machine frame and through a gear box 79 drives shaft 80 and pinion 81 held in suitable bearings. A gear 82, fixed to shaft 72a, meshes with the pinion 81. Shaft 72a at the opposite side of the conveyor drives gear 83 which meshes with idler gear 84 which in turn meshes with idler gear 85 which in turn drives gear 86 which is rigidly fastened to shaft 73a to rotate the same. It will be understood that the gears are mounted on suitable shafts which have bearings supported by the side plates 76 and 77 which were previously mentioned. The side plates 76 and 77 are rigidly connected by cross plates 87 and 88 and each of these cross plates supports a scraper blade 87a and 88a, respectively, for the purpose of scraping the surfaces of rollers 73 and 72 so as to keep them clean.

FIGS. 3 and 4 additionally show the structure which supports the members 67, 69, and related parts. Side frame members 89 on opposite sides of the machine support the idler member 69. Frame members 1 connect lower members 89 with the members which receive bolt connections 66. FIG. 3 also shows sprockets associated with the members 67 and 69 which are connected by the drive member 68 mentioned previously. FIG. 3 also shows the drive member 70 leading to a sprocket 70a which drives the member 69 and, through connecting drive 68, drives the member 67.

Referring now to FIG. 2, the breaded meat patties drop off the left-hand end of conveyor 63 onto the roll 72 and travel in the direction of the arrows between the very narrow space 90 at the point of closest approach between the two rolls. Preferably, in this first embodiment of the invention, this space 90 is of the order of $\frac{1}{16}$ to $\frac{3}{32}$ inch and a further discussion will be given this point later. The rollers are hard surfaced metal rolls to exert the necessary pressure. The meat patty in its squeezed and flattened condition then drops downwardly on an endless conveyor belt 91 which passes around an idler 92 and is driven from the member 69 previously mentioned. From the end of the conveyor 91 the flattened patty or fritter travels along a short transfer conveyor 93 (FIG. 1) to a conveyor 12a where it enters on a breading machine exactly like the first described one and the parts of which are given identical reference characters to those first used with the suffix "a." Thus, at the left-hand end of FIG. 1, the flattened fritter with a breaded coating is discharged from the conveyor 35a onto a packing conveyor 93a from which the finished product is picked off by operators and packaged as desired.

The final product of the above described method is believed to be a novel food product. In FIG. 5 this is illustrated in a somewhat enlarged manner indicating the original meat product as having been flattened down by the rollers 72 and 73 from an original thickness in the neighborhood of $\frac{1}{4}$ to $\frac{5}{8}$ inch to a final thickness in the neighborhood of $\frac{1}{16}$ to $\frac{3}{32}$ inch when passing through the narrow space 90 between the rollers. The increase in area between the original meat slice 11, as shown at A, FIG. 9, and the flattened patty B is approximately 100 to 150 percent. Because of the first breading of the meat slice 11, in the final product the breadlike material indicated at 94 has been forcibly impregnated into the meat extending almost entirely through the thin product after it passes the narrow opening 90. This product is useful without the final breading which is indicated at 95 but this produces a more attractive and generally more desirable final product. Breading equipment other than herein described may be used in practicing the method and in making the product described herein.

In the modification shown in FIGS. 6, 7 and 8, it will be understood that everything is identical with that described in connection with the first form except for those parts and conditions which are specially described here. Parts like those originally described will be given the same reference characters and only the new parts will receive new reference characters.

In FIG. 6, the meat slices 11 of original thickness and area which have been through the first breading machine pass beneath rolls 52 to lightly press the breaded material into the upper and lower sides of the meat slices with a back-up plate 54 beneath the conveyor belt 35 as originally described. Here, side boards 96 are provided closely along both sides of the imperforate conveyor belt 35 so as to hold an excess of coarse cracker crumbs or bread-like material on the conveyor belt for a purpose later described. Instead of using a chainlike belt 55 as in the first described modification to drop out the excess cracker crumbs, in this embodiment the meat slices 11 embedded in the cracker crumbs 97 are transferred from belt 35 to inclined belt 98 which preferably is of chainlike construction and adapted to travel around end rollers 99 and 100 which are mounted in a holding frame 101 analogous to frame 65 previously described. Conveyor 98 is driven by a belt or chain drive like that shown at 68 in the previously described embodiment but is omitted from the present drawings as being unnecessary to an understanding of the invention. An imperforate plate 102 is provided entirely across the conveyor 98 and of a sufficient length to carry the desired amount of cracker crumbs over into the rolling operation as will be presently described. Side boards 103 are provided on opposite sides of plate 102 and conveyor 98 so as to hold the cracker crumb bed on the conveyor as it moves the meat slices up the incline.

The rollers 72' and 73' are analogous to 72 and 73 previously described and are mounted in bearings 74 and 75, respectively, which are part of a frame 76 which was originally described. In this form of my invention, I start with a slice of raw meat preferably 3/16 inch to 1/4 inch thick and preferably held at a chill temperature of 32 to 36 degrees Fahrenheit for the purpose of giving it a little rigidity. In this case, the rolls 72' and 73' are set to provide a gap at their nearest point of approach 104 which is approximately 1/4 inch with a variation of 1/16 inch over or under the measurement.

Referring to FIGS. 6 and 8, the curtain of crumbs discharged from the upper end of conveyor 98 along with the meat slices 11 is preferably approximately 3/4 of an inch thick with the meat slices buried in approximately the center thereof. The amount of bread crumbs is so timed with the speed of the rotation of roller 72' and 73' that the crumbs are always piled up on opposite sides of the meat slice as it passes between the bite of the rollers. As illustrated in FIG. 8, a very unusual action then takes place. The pressure between the rollers 72' and 73' is exerted against the meat slice 11 through the curtain of cracker crumbs with the result that the meat is greatly flattened and stretched out laterally while the crumbs are deeply embedded in the meat. The rollers 72' and 73' are preferably of metal given a sand blast so as to roughen them slightly thus enabling them to carry the excess amount of crumbs 97 through the gap between the rollers.

Upon its discharge from the rollers 72' and 73', the flattened patty 11' falls onto a conveyor 91' which is analogous to the conveyor 91 previously described except that the conveyor 91' is made somewhat shorter at the right-hand end as viewed in FIG. 6 and is made of perforate material so that excess crumbs falling away from the squeezing rollers and from the under side of the meat patty 11' will fall downwardly where it is preferably collected and feed back to a screw conveyor 30 as previously described. On the belt 91', the excess crumbs on the under side of the patty 11' will fall away but some excess crumbs may remain on the top thereof. To clear these away, a pipe 105 carrying compressed air from a source not shown, provides an air jet 106 directed toward the top of the meat patty 11' as it passes along the conveyor so as to thus clear away the excess crumbs.

It should be understood that the product coming off the conveyor belt 91' may be used in that form but preferably is passed by way of a transfer conveyor 93 to a belt 12a as in the first described embodiment so as to pass through a second breading machine such as was previously described and thus give a completely breaded article to be sold to the customer.

The result of the process of the second described embodiment of my invention is quite similar to that described in the first form and illustrated in FIG. 5. The area of the original meat patty as illustrated at A in FIG. 9 is flattened out and increased approximately 100 to 150 percent as shown at B in FIG. 9 and the crumbs or breadlike material is deeply embedded in the meat of the patty. If, as occasionally happens, an inspector notices a patty 11' on the conveyor 91' which is not quite large enough in area, because the meat was tough or for some other reason, he immediately throws this meat patty into the gap 104 between the rollers 72' and 73' so as to give it one more pass between the rollers and thus increase its area.

In both described embodiments of my invention, one function of the breadlike material or crumbs deeply embedded in the meat is to hold the meat in its finally flattened form. One familiar with meat products will understand that you might squeeze the meat out to a greater area in the absence of the breadlike material and the meat would have some resiliency and tend to return toward its original shape and area. The curtain of cracker crumbs becomes incorporated in the meat and resists this resiliency, thus holding the meat in its flattened shape.

The product of both of the above described methods are of approximately the same thickness, and in each case the meat in the finished patty has the coarse cracker crumbs deeply embedded in it.

What is claimed is:

A method of making a food product in the form of a patty comprising applying a coating of crumbs of breading material to a slice of raw meat and subsequently compressing said slice under pressure great enough to force the crumbs deeply into the meat, to substantially reduce the thickness of the slice, to expand the area of the slice approximately 100 to 150 percent, and to cause the slice to be impregnated with the crumbs substantially throughout its thickness.

References Cited by the Examiner

UNITED STATES PATENTS

| | | | |
|---|---|---|---|
| 2,507,486 | 5/50 | Weissenbach | 99—107 |
| 2,659,338 | 11/53 | Harrison. | |
| 2,716,608 | 8/55 | Renish | 99—194 |
| 2,731,942 | 1/56 | Anderson | 118—16 |
| 2,845,040 | 7/58 | Ray | 118—13 |

A. LOUIS MONACELL, *Primary Examiner.*

HYMAN LORD, *Examiner.*